Figure 1:
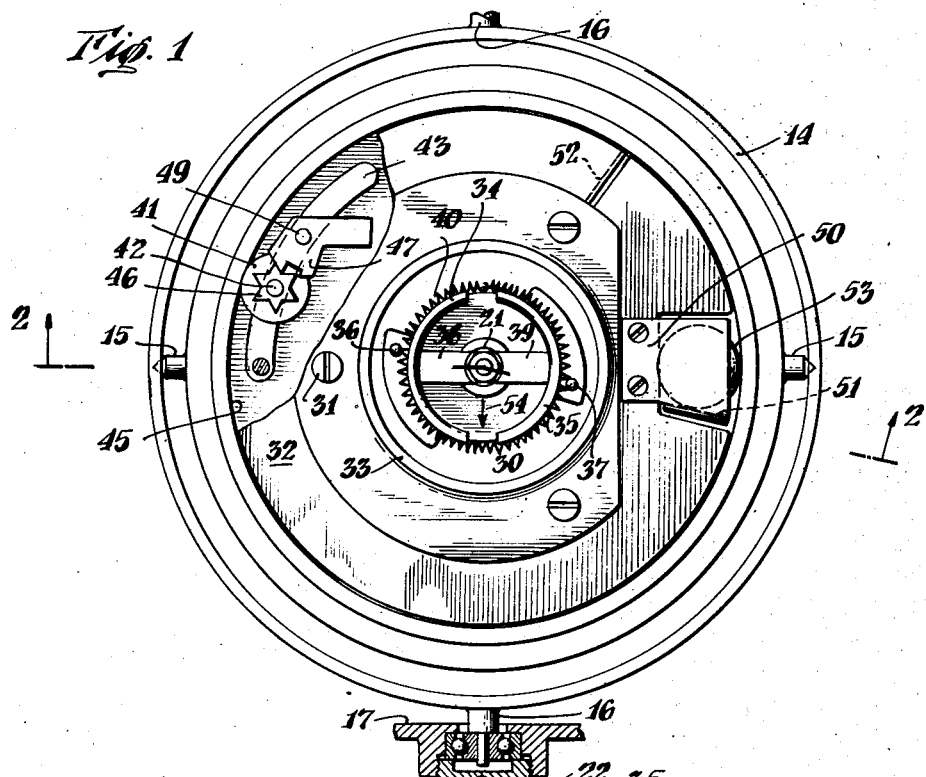

March 6, 1945.  V. R. KIMBALL  2,370,904

GYRO ERECTING MECHANISM

Filed July 16, 1942

INVENTOR.
Vernon R. Kimball
BY
ATTORNEY

Patented Mar. 6, 1945

2,370,904

UNITED STATES PATENT OFFICE 2,370,904

GYRO ERECTING MECHANISM

Vernon R. Kimball, Maywood, N. J., assignor to Bendix Aviation Corporation, Bendix, N. J., a corporation of Delaware Application July 16, 1942, Serial No. 451,173

5 Claims. (Cl. 74—5)

This invention relates to gyroscopic devices of the type adapted for indicating the true vertical so as to provide an artificial horizon on moving vehicles such, for example, as aircraft, and more particularly, to self-erecting means for such devices for maintaining the gyro spin axis vertical.

Devices of this general nature are known in the art, as represented by the United States patent to Robert Alkan, 2,159,118 issued May 23, 1939. Although suitable for most purposes, the problem with the use of such devices has been the lack of a suitable and rapid friction drive from the gyro rotor to the erecting mechanism. For example, unless the speed of the erecting mechanism has followed the gyro rotation in a proper and predetermined relationship, the effect of acceleration forces or bearing friction will be to process the rotor from the true vertical and the erecting mechanism will not function properly when needed.

An object of the present invention, therefore, is to provide a gyro vertical or artificial horizon with novel erecting means having an improved friction drive which operates rapidly and effectively to maintain the proper and desired speed relationship between the gyro rotor and the erecting mechanism.

Another object of the present invention is to provide a gyro vertical or artificial horizon having highly improved and novel means for rapidly damping the oscillations or precession of the gyroscope about its position of equilibrium.

A further object of the invention is to provide a novel gyro vertical or artificial horizon in which disturbances thereof due to acceleration forces or bearing friction are substantially reduced thereby improving the character of the gyroscope as a navigational instrument.

The above and other objects and advantages of the invention will appear more fully hereinafter from a consideration of the detailed description which follows, taken together with the accompanying drawing wherein one embodiment of the invention is illustrated. It is to be expressly understood, however, that the drawing is for the purpose of illustration and description only and not designed as a definition of the limits of the invention.

Figure 2:
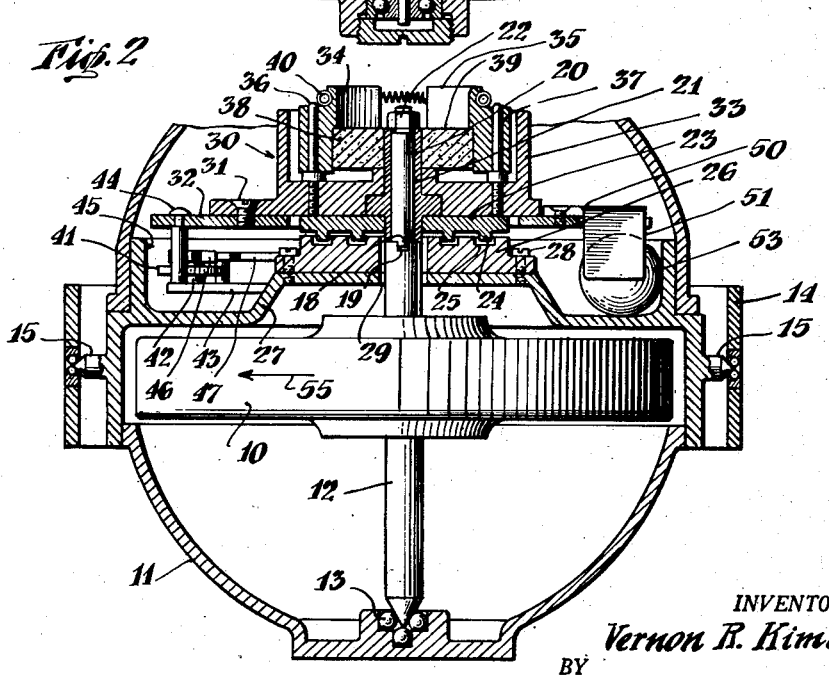

In the drawing, wherein like reference characters refer to like parts in both views, Figure 1 is a top plan view of a gyro vertical embodying the present invention, with a top portion of the gyro casing removed, showing the novel erecting means of the invention; and, Figure 2 is a vertical section taken substantially along line 2—2 of Figure 1.

The gyro vertical embodying the invention comprises a gyroscope having a gyro rotor mounted in a gimbal suspension for spinning about a normally vertical axis and for angular movement about two mutually perpendicular horizontal axes at right angles to the spin axis, the rotor being enclosed and journalled in a casing carried by the gimbal suspension. The gyro rotor may be driven electrically or in any other suitable and desired manner known in the art.

The improved and novel means for stabilizing the gyroscope and, thus, maintaining its spin axis vertical in order that the gyroscope may serve as a gyro vertical or artificial horizon comprises a weight in the form of a rolling ball confined to travel in a circular path about the rotor spin axis. For this latter purpose there are provided means in the form of a frame or carriage mounted coaxially with the gyro rotor spin axis to rotate the ball about the gyro spin axis.

Novel driving means having a slip driving connection to the gyro rotor shaft are provided for driving the frame to roll the ball about its circular path, together with braking means for retarding the rotation of the frame and rolling of the ball to produce slipping action in the drive between the frame and gyro rotor shaft, thereby causing the rotation of the frame to be at a speed substantially smaller than the speed of rotation of the gyro rotor. The braking means are in the form of an escapement device carried by the frame and cooperating with a wall of the gyro casing.

As long as the rotor axis remains in its normally vertical position, the frame rotates at a substantially constant speed which, as pointed out before, is considerably smaller than the speed of rotation of the gyro rotor. For example, the frame may rotate at a speed of only a few dozens of revolutions per minute, while the gyro rotor may have a speed of several thousand revolutions per minutes.

As soon, however, as the gyro spin axis departs from its normally vertical position, due to bearing friction, accelerations or other disturbing forces, the rolling ball cooperates with the braking means to cause the latter to produce a variable retarding action on the frame, and, therefore, on the ball, whereby erecting forces are developed which return the gyro spin axis back to vertical at which time the frame and ball are again brought back to a constant speed.

Referring now to Figures 1 and 2 of the drawing for a more detailed description, the present invention is shown as comprising a gyroscope including a rotor 10 mounted within a casing or housing 11 for spinning about a normally vertical axis. The rotor 10 has a shaft or trunnion 12 secured thereto or formed integrally therewith, one end of the shaft being journalled in a bearing 13 at the bottom of casing 11 while the upper end of the shaft is journalled in a similar bearing (not shown) in the upper part of the casing.

The casing 11, in turn, is mounted in a gimbal suspension comprising a gimbal ring 14 in which the casing is pivoted for angular movement about a horizontal axis formed by the trunnions 15, 15, the gimbal ring, in turn, being pivoted for angular movement about a second horizontal axis, perpendicular to the first axis, formed by trunnions 16, 16 which are journalled in a fixed support 17.

A stub shaft 20 is driven by shaft 12 and for this purpose the stub shaft is provided with a projection 18 cooperating with a groove or transverse recess 19 formed in shaft 12. A friction driving hub or drum 21 is secured for rotation with stub shaft 20 by means of a bolt 22 and, secured for rotation with drum 21 is an annular flange 23 provided with annular projections 24 which, in turn, cooperate and mesh with annular recesses 25 formed in a bearing cap 26 secured to a drum 27 by way of fastening means 28.

Drum 27 is secured to and forms a part of casing 11 and is arranged coaxially with and above the gyro rotor as shown in Figure 2, there being an opening 29 at its central portion for accommodating rotor shaft 12. If desired, a bearing (not shown) may be arranged in opening 29 for additional journalling of the rotor shaft.

The arrangement of bearing cap 26 and rotatable flange 23 in the described manner serves a highly useful and desirable purpose by preventing the entry and accumulation of dirt and grease to the rotor housing and the rotor shaft bearings.

A friction housing 30 is mounted concentrically with drum 21 and is provided at its lower end with a substantially annular flange to which is secured by means such as screws 31, a suitable annular carriage or frame 32, for rotation about the spin axis at a speed substantially less than the speed of rotation of the gyro rotor, in a manner to presently appear.

The friction housing 30 is provided with an outer cylindrical shell 33 which, together with the outer periphery of drum 21, forms a chamber for the novel slip-drive mechanism. Such mechanism comprises a pair of arcuate members or ring segments 34 and 35 which are pivotally supported within the mechanism chamber by way of pins 36 and 37, respectively, which, in turn, are secured to the base of friction housing 30. Each of segments 34 and 35 is provided with recessed portions for securely holding a pair of friction shoes 38 and 39, the free and operative faces of which engage with drum 21.

A helical spring 40 is provided at the outer top edges of both segments 34 and 35 to yieldably pivot them about pins 36 and 37 to urge friction shoes 38 and 39 into engagement with drum 21. Tension of the friction shoes upon the driving drum may be varied and regulated, as desired, by changing the length of the helical spring. By virtue of the connection of friction housing 30 with carriage 32 and the fact that the friction housing 30 has secured thereto the segments 34 and 35 carrying friction shoes 38 and 39, the carriage 32 is rotated by drum 21 about the gyro rotor spin axis.

The speed of rotation of carriage 32 must be substantially smaller than that of the rotor and likewise substantially independent of any variations in the rotor speed. Braking and regulating means are provided for this purpose and constitute a roller 41 journalled by means of a shaft 42 in an arm 43 pivoted and secured to carriage 32 at 44. Roller 41 engages the wall 45 of drum 27 to roll therealong when in engagement therewith while carriage 32 is rotated. Secured to or formed integrally with shaft 42 of roller 41 to rotate therewith is an escapement starwheel 46 which cooperates with a forked anchor 47 pivoted at 49 on arm 43. The foregoing structure provides an escapement device having a non-isochronous return, the frequency or period of oscillation of the anchor depending on the speed of rotation of roller 41 and starwheel 46 to thus provide a small retarding force on roller 41 during relatively small speeds and a greater retarding force during increased speeds to maintain the carriage rotation at a substantially constant speed.

The pivotal axis 49 of anchor 47 is arranged parallel to the gyro rotor spin axis and it is advantageous to locate the center of gravity of anchor 47 away from its pivotal axis to thereby form a block oriented in azimuth in such a manner that the period or frequency of oscillation of the anchor, and, therefore, the speed of rotation of carriage 32 shall be effected not only by variations of the speed of rotor 10 and shaft 12 but also by acceleration forces impressed upon the anchor.

In order to render the system operative and effective to produce erecting forces for returning the gyro spin axis to vertical in the event the spin axis departs from vertical for any reason, the outer periphery of carriage 32 is provided with a cut out portion to accommodate a bracket 50, suitably fastened to the carriage, and having a wall member 51, forming an auxiliary mass, formed integrally therewith and projecting toward drum 27 as shown in Figure 2. A second wall member 52 (Fig. 1), similar to member 51, is formed on the carriage or carried thereby and likewise projects toward drum 27. A relatively heavy weight in the form of a rolling ball 53 is now provided for rolling within a circular track or path defined by drum 27 and its side wall 45 and confined for limited rolling movement between wall members 51 and 52. If desired, wall member 52 may be dispensed with and ball 53 permitted to roll between wall member 51 and the free end of arm 43.

In operation, when the gyro rotor 10 is rotated with its shaft 12, the driving hub or drum 21, secured for rotation with stub shaft 20, drives carriage 32 through friction shoes 38, 39, segments 34, 35 and friction housing 30, thereby rotating the carriage about rotor shaft 12, together with rolling weight or ball 53 about its path, and roller 41 about wall 45. Rotation of roller 41 along wall 45 is regulated and limited by the action of anchor 47 which, in turn, depends upon the speed of rotation of carriage 32.

Should the speed of rotation of carriage 32 increase due to either an increase in the speed of rotation of rotor 10 or due to other causes, the rotation of roller 41 along wall 45 is braked due to the increased frequency of oscillation of anchor 47 upon starwheel 46, thereby retarding the rotation of carriage 32 and the rolling of ball 53 against the action of the friction shoes upon the driving drum.

With a decrease in the speed of rotation of carriage 32, anchor 47 oscillates less frequently because the speed of rotation of roller 41 is decreased thereby reducing the braking action produced by the anchor upon roller 41, permitting a substantially unopposed drive between the driving drum 21 and friction shoes 38 and 39. In this manner the speed of rotation of carriage 32 is increased. As a result, carriage 32 and rolling ball 53 tend to take up a speed of rotation such that the braking action of anchor 47 always increases upon increased carriage speed to oppose the driving torque between the driving drum and the friction shoes and decreases its opposition to the driving torque at reduced carriage speed bringing about a substantially constant speed of rotation of the carriage, which is entirely independent of the gyro rotor speed, and which can be brought down to a few dozens of revolutions per minute even though the rotor 10 and driving drum 21 rotate at several thousand revolutions per minute.

Assuming now that an acceleration force acts in the direction of central arrow 54 shown in Figure 1, and the plane of the paper, causing a departure of the rotor spin axis from the normally vertical position, and the gyro rotor together with carriage 32 are rotating clockwise as indicated by arrow 55 (Fig. 2), the action of the acceleration force exerted on wall member 51 will tend to increase the speed of carriage rotation at the instant member 51 is in the position shown in Figure 1 and, at the same time, ball 53 will roll against member 51 thereby tending to cause a further increase in the speed of carriage rotation until the moment when wall member 51 reaches a position diametrically opposite to that shown in Figure 1, at which point ball 53 rolls from member 51 to member 52 producing a momentary stopping of carriage rotation. Because of this momentary stopping of the ball and carriage in the position diametrically opposite to that shown in Figure 1, moments are developed by the ball due to gravitational pull thereon in a direction toward the plane of the paper and about trunnions 16, 16 thereby causing the rotor spin axis to precess about trunnions 15, 15 back to its normally vertical position.

Since the speed of rotation of carriage 32 and the rolling of ball 53 is entirely independent of any variations in gyro rotor speed and, therefore, substantially constant when the rotor spin axis is in a true vertical position, the only variation in the speed of carriage rotation and the rolling of the ball is that caused by accelerations acting on ball 53 and wall member 51 and that due to deviation of the spin axis from the true vertical. For this reason, even a small acceleration is sufficient to make the time during which the ball travels around one half of the circumference to materially differ from the time required for it to travel around the other half of the circumference. Such a variation manifests itself by a tendency of the gyro to erect its spin axis in the direction of the acceleration and by a direct precessional movement and not by a spiral precessional movement.

The foregoing operation of the erecting mechanism has been described only in connection with acceleration forces acting to disturb the rotor spin axis. However, tilting of the rotor spin axis due to bearing friction or causes other than acceleration forces results in the same operation of the erecting mechanism with the exception that in place of the acceleration forces, a gravitational pull is exerted upon ball 53 to speed up its rolling motion over one-half of the circumference of wall 45, depending upon the direction of tilt, and to slow up the ball during its upward movement. At the time that upward movement begins, momentary stopping of carriage 32 and ball 53, due to gravitational pull which is in the opposite direction at this point, results to create moments about either trunnions 15 or 16, again depending upon the direction of tilt, to cause the rotor to precess into its normally vertical position.

From the foregoing, it will be apparent to those skilled in the art that a novel gyro vertical has been provided having novel erecting means for maintaining the gyro spin axis in a true vertical position at all times without the use of pendulum controlled reaction air jets. By reason of the improved and novel erecting means, the erecting system is not disturbed when the gyro vertical is used on aircraft during violent maneuvers but continues to perform its function properly and efficiently at all times.

Although but a single embodiment of the invention has been illustrated and described, various changes and modifications in the form and relative arrangement of parts, which will now appear to those skilled in the art, may be made without departing from the scope of the invention. Reference is therefore to be had to the appended claims for a definition of the limits of the invention.

I claim:

1. In a gyro vertical, the combination of a gyroscope comprising a rotor mounted for spinning about a normally vertical axis, a casing mounting said rotor for angular movement about two mutually perpendicular horizontal axes at right angles to the spin axis, said casing having means forming a circular track coaxial with said spin axis, a rotatable carriage, means mounting said carriage for rotation about the spin axis of said rotor, a slip-drive connection between said rotor and said carriage comprising a friction member driven by said rotor and a pair of diametrically opposed friction shoes carried with said carriage and engaging said friction member whereby said carriage is rotated at a speed substantially less than the speed of said rotor, resilient means arranged concentrically with said rotor spin axis for urging said shoes into engagement with said member, regulating means carried by said carriage and in engagement with said casing for maintaining the speed of carriage rotation substantially constant while the spin axis of said rotor is in its normally vertical position and adapted to vary the speed of carriage rotation when the spin axes of said rotor deviates from said vertical position, and a weighted mass adapted for movement with said carriage and in said track and being relatively displaceable upon deviation of said spin axis to actuate the regulating means to vary the speed of rotation of said carriage whereby erecting forces are developed on the gyroscope to return said spin axis to its normally vertical position.

2. In a gyro vertical, the combination of a gyroscope comprising a rotor mounted for spinning about a normally vertical axis, a casing mounting said rotor for angular movement about two mutually perpendicular horizontal axes at right angles to the spin axis, a friction drum driven by said rotor coaxially with said spin axis, a friction housing sleeved for relative rotation about said drum, a pair of friction shoes mounted within said housing, means comprising a resilient member arranged concentrically with said spin axis for yieldably urging said shoes into engagement with said drum whereby said housing is rotated at a speed substantially less than the speed of said rotor, a carriage secured for rotation by said housing, braking means on said carriage and in engagement with said casing for maintaining the speed of carriage rotation substantially constant when the rotor spin axis is in its normally vertical position and adapted to vary the speed of carriage rotation when said rotor spin axis deviates from said vertical position, and a weighted mass normally adapted for movement by said carriage about a path concentric with said spin axis and being relatively displaceable with respect to said carriage upon deviation of said rotor spin axis to actuate the braking means to vary the speed of rotation of said carriage whereby erecting forces are developed on the gyroscope to return said spin axis to its normally vertical position.

3. In a gyro vertical, the combination of a gyroscope comprising a rotor mounted for spinning about a normally vertical axis, a casing mounting said rotor for angular movement about two mutually perpendicular horizontal axes at right angles to the spin axis, a friction drum driven by said rotor coaxially with said spin axis, an annular and substantially hollow friction housing sleeved for relative rotation about said drum, a pair of arcuate members pivotally mounted within said housing, a pair of friction shoes supported by said members, an annular resilient member engaging said arcuate members to urge said shoes into engagement with said drum whereby said housing is rotated at a speed substantially less than the speed of said rotor, a carriage secured for rotation by said housing, braking means on said carriage and in engagement with said casing for maintaining the speed of carriage rotation substantially constant when the rotor spin axis is in its normally vertical position and adapted to vary the speed of carriage rotation when said rotor spin axis deviates from said vertical position, and a weighted mass normally adapted for movement by said carriage about a path concentric with said spin axis and being relatively movable with respect to said carriage upon deviation of said rotor spin axis to actuate the braking means to vary the speed of rotation of said carriage whereby erecting forces are developed on the gyroscope to return said spin axis to its normally vertical position.

4. The combination with a gyro vertical having an erecting mechanism for maintaining the rotor spin axis in a normally vertical position and comprising a carriage rotatable about the rotor spin axis at a substantially constant speed less than the speed of rotor rotation when the spin axis of said rotor is in its normally vertical position and at a varying speed when the rotor spin axis deviates from the vertical position, of a friction drive between said rotor and said carriage comprising a friction drum coaxial with the rotor spin axis and driven by the rotor, an annular and substantially hollow friction housing mounting said carriage and sleeved for rotation about said drum, a pair of diametrically opposed friction shoes, means pivotally mounting said shoes within said housing, and resilient means arranged concentrically with said drum and engaging said last-named means for urging said shoes into engagement with said drum.

5. The combination with a gyro vertical having erecting means therefor for maintaining the rotor spin axis in a normally vertical position and comprising a carriage rotatable about the rotor spin axis at a substantially constant speed less than the speed of rotor rotation when the spin axis of said rotor is in its normally vertical position and at a varying speed when the rotor spin axis deviates from the vertical position, of a slip-drive connection between said rotor and said carriage comprising a friction drum coaxial with the rotor spin axis and driven by the rotor, an annular and substantially hollow member mounting said carriage and sleeved for rotation about said drum, a pair of arcuate members pivotally mounted within said annular member, a pair of friction shoes supported by said arcuate members, and an annular resilient member engaging said arcuate members to yieldably urge said shoes into driving engagement with said drum.

VERNON R. KIMBALL.